N. A. HILL.
AIR BRAKE.
APPLICATION FILED JULY 30, 1909.
1,007,105.
Patented Oct. 31, 1911.
2 SHEETS—SHEET 1.
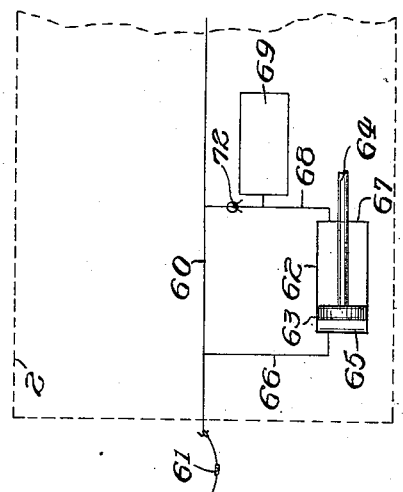
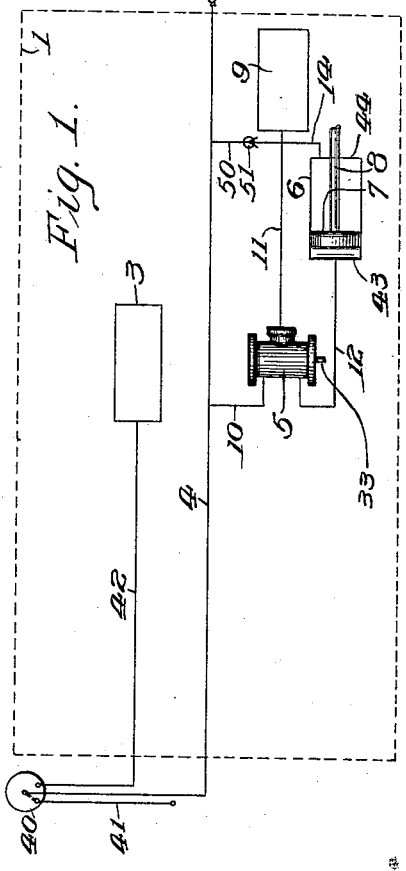
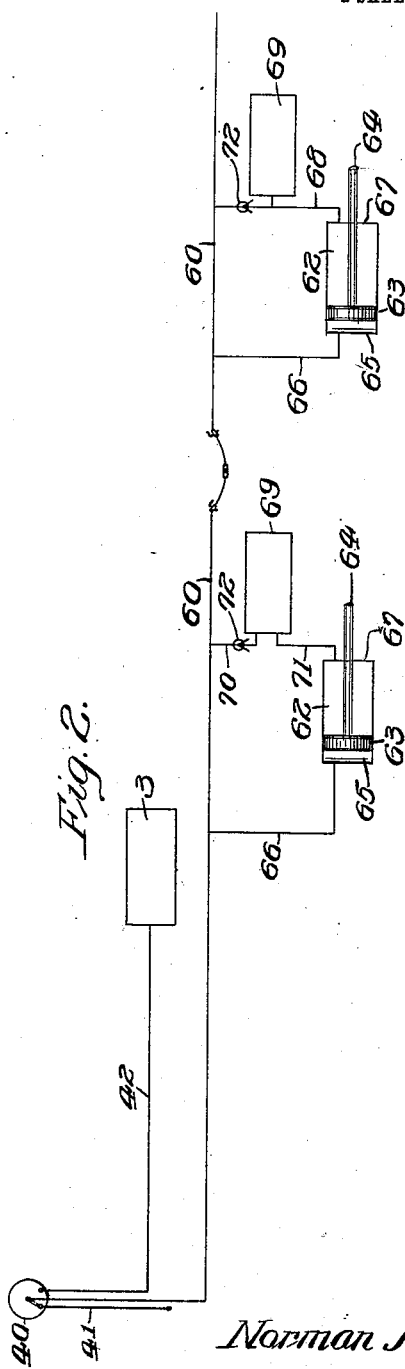
WITNESSES
INVENTOR
Norman A. Hill.
BY
ATTORNEY

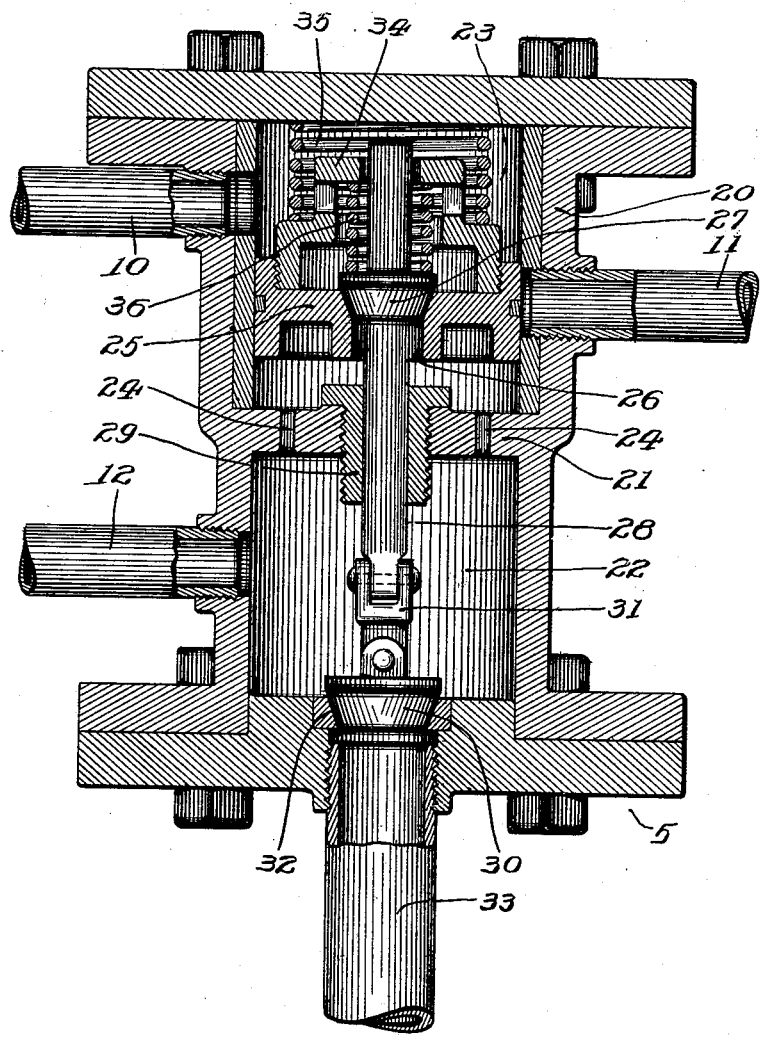

_UNITED STATES PATENT OFFICE._

NORMAN A. HILL, OF BALTIMORE, MARYLAND.

AIR-BRAKE.

1,007,105.

Specification of Letters Patent.

Patented Oct. 31, 1911.

Application filed July 30, 1909. Serial No. 510,392.

_To all whom it may concern:_

Be it known that I, NORMAN A. HILL, a citizen of the United States, and a resident of the city of Baltimore and State of Maryland, have invented certain new and useful Improvements in Air-Brakes, of which the following is a full, clear, and complete disclosure.

My invention relates to air brake equipments as applied to steam or trolley cars running either singly or in trains, and especially to that class of air brakes in which the brakes are both applied and released by air pressure, as distinguished from those systems in which while the brakes are set by air pressure, they are released by springs or the like, as in the Westinghouse and New York air brake systems.

One of the objects of my invention is to provide a simplified form of air brake which may be used in conjuncton with other forms of automatic air brakes in which the brakes are applied by a decrease in pressure in the train pipe and released by an increase in pressure in the same.

I have found my simplified system especially adapted for trains composed of a motor car and one or more trailers which are usually not provided with motors. In this case I provide the trailers with my simplified air brake and connect the train pipe of the same to the train pipe of the motor car, from which it results that the brakes of the trailers as well as that of the motor car may be controlled by a single valve. However, if desired, my simplified brake may be used alone either on a single car or a train of cars.

A further object of my invention is to provide means in an automatic air brake system for directly connecting the auxiliary reservoir to the train pipe in such a way that the pressure in the reservoir may be maintained at least as great as that in the train pipe, while at the same time the pressure of the same is not affected by a reduction of the pressure in the train pipe except by way of the brake cylinder.

More specifically stated, my improvements contemplate a direct pipe connection between the train pipe and the auxiliary reservoir, in which is provided a check valve which permits the passage of air from the train pipe into the reservoir but prevents the passage of the air in the opposite direction, that is, from the auxiliary reservoir to the train pipe. It may be also pointed out that with my improvements the automatic valve, which is universally used in systems of this nature, may be omitted, and most satisfactory results obtained in controlling the brakes of one or more cars.

With these and other objects in view, I have devised the system which is hereinafter particularly described and illustrated in the accompanying drawings and specifically pointed out in the appended claims.

In the drawings, Figure 1 is a diagrammatic representation of my system as applied to a motor car and a trailer; Fig. 2 is a diagrammatic view of another application of my system; Fig. 3 is a vertical cross section through an automatic valve capable of being used in my system.

In Fig. 1, the position of a motor car and a trailer or follower is represented by the dotted lines 1 and 2, respectively. The air brake equipment of the motor car comprises the main reservoir 3, the train pipe 4, the automatic valve 5, the brake cylinder 6 and the auxiliary reservoir 9. The brake cylinder 6 is provided with a piston 7 and a rod 8, which is suitably connected with the mechanism for operating the brakes. It will be noted that no spring is used in the brake cylinder as in systems now in use. There is air pressure on both sides of the piston, which is substantially the same over a unit area, but the area of cross section of the rod 8 is made large enough so that the pressure on the opposite side of the piston is enough greater than the total pressure on the adjacent side of the piston as to move the same in the direction of the rod 8 when the unit pressure on both sides is substantially the same. In other words, the piston is reciprocated by what might be called a differential air pressure.

The automatic valve 5 is directly connected by the pipe 10 with the train pipe 4, by the pipe 11 with the auxiliary reservoir 9, and by the pipe 12 with the end 43 of the cylinder 6. The auxiliary reservoir 9 is connected with the other end 44 of the cylinder by the pipe 14. The brakes are applied by reducing the pressure in the end 43 of the brake cylinder, whereupon the pressure in the auxiliary reservoir forces the piston to the end 43 of the cylinder, in which position the brakes are applied. The brakes are released by building up the pressure in the end 43 of the cylinder, by which means the piston 7 is forced over to the end 44 of the cylinder 6, in which position the brakes are released. The automatic valve 5 is composed of the cylindrical casing 20, which is divided by the partition 21 into the lower chamber 22 and the upper chamber 23, which are in communication with each other, as through the ports 24 in the partition 21. The upper chamber 23 is provided with a piston 25, which is mounted to reciprocate therein. This piston has a central port 26 therein, which is closed by a valve 27. The latter is rigidly connected to the stem 28, which is suitably guided in the bushing 29 in the partition 21, and has at its lower end the valve 30, which has a double-jointed connection 31 with the stem 28. The valve 30 is adapted to form a closure for the port 32, which is open to the outer air through the pipe 33. The piston 25 is provided with a perforated cap 34 and a spring 36 bearing against this cap, and the valve 27 serves to keep the valve on its seat. The spring 35 bears against the upper portion of the cap 34 and is adapted with the spring 36 to maintain the piston 25 in such a position as to close the opening into the pipe 11 when the pressures on both sides of the piston are equal. As stated above, the pipe 11 communicates with the auxiliary reservoir 9. The chamber 23 is connected with the train pipe 4 by the pipe 10, and the chamber 22 is connected to the brake cylinder 6 by the pipe 12. The operation of this valve is as follows: When the pressure in the train pipe 4 is diminished, as by connecting it with the open air through the manually operated valve 40 and the open air pipe 41, the piston 25 is moved upwardly by the greater pressure on its lower side, the valve 30 is unseated, and the pipe 12 is connected with the open air. The pressure from the auxiliary reservoir 9 then forces the piston 7 to the end 43 of the cylinder 6, in which position the brakes are applied. At the same time, the pressure on the lower side of the piston 25 is reduced by the air escaping through the pipe 33, and when the pressure on both sides of the piston 25 becomes equal, the piston returns to the position which it occupied at first. To release the brakes the train pipe 4 is put in connection through the manually operated valve 40 with the main reservoir 3 through the pipe 42. As the pressure increases in the chamber 23, the piston 25 is forced downwardly. The port to the auxiliary reservoir 9 is uncovered and the pressure of the same is built up. At the same time, the valve 27 is unseated and the main reservoir 3 is put in communication with the end 43 of the cylinder 6, opposite to the end 44, with which the auxiliary reservoir 9 communicates. The pressure of the main reservoir 3 is thus applied to both sides of the piston, but on account of the difference in the area of the two sides of the piston, it is forced to the end 44 of the cylinder, in which position the brakes are released. Means are also provided for automatically maintaining the pressure in the auxiliary reservoir at least as great as that in the train pipe, otherwise than through the automatic valve. For this purpose I connect the auxiliary reservoir directly to the train pipe. Various ways of effecting this result may be used. In the present instance, the train pipe is connected to the pipe 11, which is always in communication with the auxiliary reservoir 9, through pipe 50. In this pipe I place a check valve 51, which opens in the direction of the auxiliary reservoir and is adapted to be operated by a difference in pressure between the train pipe and the auxiliary reservoir. When the pressure in the train pipe is greater than that in the auxiliary reservoir, air will flow through the valve and equalize the pressure. When, however, the opposite conditions exist, namely, when the pressure in the train pipe is less than that in the auxiliary reservoir, the valve will be held closed.

When my system is used on a train having two or more cars, a much simpler form of the equipment may be used on the rear cars, as shown in Fig. 1. In this figure I have indicated a trailer or follower by the dotted lines 2. This car is provided with a train pipe 60, which is suitably connected with the train pipe 4 by the usual connection 61. It is also provided with a brake cylinder 62, in which reciprocates the piston 63, having the brake rod 64 attached thereto. The end 65 of the cylinder 62 is connected to the train pipe 60 by means of a pipe or conduit 66. The other end 67 of the cylinder 62 is provided with a pipe 68, which communicates both with the auxiliary reservoir 69 and the train pipe 60. If desired, however, there may be a pipe 70, as shown in Fig. 2, connecting the auxiliary reservoir 69 with the train pipe 60, and another pipe 71 connecting the auxiliary reservoir 69 with the brake cylinder 62. In the portion of the pipe between the auxiliary reservoir 69 and the train pipe 60 is located a check valve 72, which opens in the direction of the auxiliary reservoir 69.

My simplified brake system may be advantageously used on a trailer or follower, as shown in Fig. 1, where the front or motor car is provided with an automatic valve in its air brake equipment, or my system may be used alone, as shown in Fig. 2. In this figure, I have shown a train of two cars, each provided with an air brake equipment similar to that shown on car 2 of Fig. 1. The construction and operation of this application of my system will be obvious from the foregoing description.

The system as described above is the preferred embodiment of my invention, but it is understood that specific terms have been used merely in an illustrative sense, and my invention covers all embodiments which lie within the spirit and scope of the appended claims.

Having now described my invention, what I claim and desire to protect by Letters Patent of the United States, is:—

1. In an air brake system, the combination of an automatic air brake valve and an air brake comprising a brake cylinder and piston, an auxiliary reservoir, a direct connection between said valve and the end of said cylinder opposite the piston rod, and a direct connection between said train pipe, piston rod end of said cylinder and said auxiliary reservoir.

2. In an air brake system, a brake cylinder, an auxiliary reservoir, an automatic valve, a train pipe, pipes connecting said valve with one end of said brake cylinder, said train pipe and said auxiliary reservoir, a pipe connecting the piston rod end of said brake cylinder and said auxiliary reservoir, and a pipe connecting said train pipe and said auxiliary reservoir, provided with a check valve adapted to prevent the passage of air from said auxiliary reservoir to said train pipe.

3. In an air brake system, the combination of an air brake equipment on one car provided with a train pipe and an automatic valve for operating the brake piston of the same, and an air brake equipment on another car comprising a brake cylinder containing a brake piston, an auxiliary reservoir, a train pipe, a pipe connecting said second train pipe with one end of said cylinder, and a pipe connecting the piston rod end of said cylinder with said auxiliary reservoir and said second train pipe, said train pipes being connected together.

4. In an air brake system, the combination of an air brake equipment on one car, provided with a train pipe and an automatic valve for operating the brake piston of the same by means of a differential air pressure, and an air brake equipment on another car, comprising a brake cylinder containing a brake piston, an auxiliary reservoir, a train pipe, a pipe connecting said second train pipe with one end of said cylinder, a pipe connecting the piston rod end of said cylinder with said auxiliary reservoir, and a pipe connecting said auxiliary reservoir and said second train pipe and provided with means for preventing the passage of air from said auxiliary reservoir to said second train pipe, said train pipes being connected together.

5. In an air brake system embodying the combination of a brake cylinder, with an auxiliary reservoir, a train pipe, fluid-conveying means connecting said auxiliary reservoir with the piston rod end of said cylinder, and like means connecting said train pipe to the piston rod end of said cylinder.

6. In an air brake system embodying the combination of a brake cylinder, with an auxiliary reservoir, a train pipe, an automatic valve, fluid-conveying means connecting said auxiliary reservoir with the piston rod end of said cylinder, like means connecting said automatic valve with the opposite end of said cylinder, means connecting said automatic valve with said train pipe, means connecting said auxiliary reservoir with said train pipe, a one-way valve in said last named means, means connecting said auxiliary reservoir with said automatic valve, a supply reservoir, and an engineer's valve connected to said last named reservoir and said train pipe to operate the system.

7. In an air brake system, in one car a brake cylinder, an auxiliary reservoir, an automatic valve, a main reservoir, a train line and an operating valve, pipes connecting auxiliary reservoir and automatic valve, auxiliary reservoir and train line, auxiliary reservoir and piston rod end of brake cylinder, automatic valve and other end of cylinder, automatic valve and train line, main reservoir, and an operating valve, train line and operating valve, a one-way valve in said second named pipe, and an air brake equipment in another car, comprising a brake cylinder, an auxiliary reservoir, a second train line pipe, pipes connecting said second train pipe with one end of said cylinder, auxiliary reservoir and the piston rod end of said cylinder, auxiliary reservoir and second train pipe, and a one-way valve in said last named pipe, said train pipes being connected together.

In witness whereof, I have hereunto set my hand this 10th day of June A. D., 1909.

NORMAN A. HILL.

Witnesses:
MAURICE J. WALL,
ALSTON B. MOULTON.

---

Copies of this patent may be obtained for five cents each, by addressing the "Commissioner of Patents, Washington, D. C."